United States Patent
Yamanaka et al.

(10) Patent No.: US 10,093,344 B2
(45) Date of Patent: Oct. 9, 2018

(54) ELECTRIC POWER STEERING APPARATUS

(71) Applicant: Mitsubishi Jidosha Kogyo Kabushiki Kaisha, Tokyo (JP)

(72) Inventors: Hiroki Yamanaka, Tokyo (JP); Hiroshi Ohi, Tokyo (JP); Seiji Chuda, Tokyo (JP); Junichi Yoshizawa, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/405,651

(22) Filed: Jan. 13, 2017

(65) Prior Publication Data

US 2017/0203782 A1    Jul. 20, 2017

(30) Foreign Application Priority Data

Jan. 14, 2016  (JP) ................................ 2016-005539

(51) Int. Cl.
*B62D 5/04*    (2006.01)

(52) U.S. Cl.
CPC ............. *B62D 5/04* (2013.01); *B62D 5/0421* (2013.01); *B62D 5/0463* (2013.01); *B62D 5/0466* (2013.01)

(58) Field of Classification Search
CPC ...... B62D 5/04; B62D 5/0421; B62D 5/0463; B62D 5/0466
See application file for complete search history.

(56) References Cited

U.S. PATENT DOCUMENTS

| | | | |
|---|---|---|---|
| 4,909,343 A | 3/1990 | Mouri et al. | |
| 7,177,745 B2 * | 2/2007 | Tsuchiya | B62D 5/0466 180/446 |
| 7,406,373 B2 * | 7/2008 | Kubota | B62D 5/0463 180/446 |
| 7,664,584 B2 * | 2/2010 | Chino | B62D 5/003 180/204 |
| 8,229,627 B2 * | 7/2012 | Yamazaki | B62D 5/0466 116/31 |

(Continued)

FOREIGN PATENT DOCUMENTS

| | | |
|---|---|---|
| JP | 2009-196573 A | 9/2009 |
| JP | 2012-45990 A | 3/2012 |
| WO | WO 2014/199882 A1 | 12/2014 |

OTHER PUBLICATIONS

Extended European Search Report dated Jun. 14, 2017 in corresponding European Patent Application 17151443.3.

*Primary Examiner* — Joseph M Rocca
*Assistant Examiner* — Michael R Stabley
(74) *Attorney, Agent, or Firm* — Birch, Stewart, Kolasch & Birch, LLP (57) ABSTRACT

An electric power steering apparatus includes a rotating assist force computing unit for computing an assist force in the rotating direction of a steering wheel, a returning assist force computing unit for computing a returning assist force, which is a steering assist force in a direction opposite to the rotating direction, and a summing unit for adding up the computed assist force in the rotating direction and the computed returning assist force. The electric power steering apparatus returns the steering wheel and steered road wheels to the neutral position at an earlier time if a driver releases his or her hands from the steering wheel when rotating the steering wheel.

4 Claims, 5 Drawing Sheets

(56) References Cited

U.S. PATENT DOCUMENTS

| | | | |
|---|---|---|---|
| 2006/0069481 A1* | 3/2006 | Kubota | B62D 5/0463 |
| | | | 701/41 |
| 2009/0157261 A1 | 6/2009 | Yamazaki | |
| 2009/0271069 A1* | 10/2009 | Yamamoto | B62D 5/0466 |
| | | | 701/41 |
| 2016/0144889 A1* | 5/2016 | Gotou | B62D 5/0466 |
| | | | 180/446 |

* cited by examiner

ELECTRIC POWER STEERING APPARATUS

The entire disclosure of Japanese Patent Application No. 2016-005539 filed on Jan. 14, 2016 is expressly incorporated by reference herein.

TECHNICAL FIELD

This invention relates to an electric power steering apparatus which, for example, is loaded on a vehicle, such as an automobile, for assisting the operation of a steering wheel.

BACKGROUND ART

An electric power steering apparatus, loaded on a vehicle, such as an automobile, for assisting the operation of a steering wheel (steering of steered road wheels), has been known. The electric power steering apparatus, for example, has an electric actuator device such as a motor, and allows the electric actuator device to generate a steering assist force for a steering mechanism. Concretely, when the steering wheel is rotationally operated (steered) by a driver, the electric power steering apparatus actuates the motor to generate a steering assist force, which is conformed to the steering state of the steering wheel, in a rotating direction. In this manner, a steering torque which the driver requires for steering the steering wheel is reduced.

If the driver releases his or her hands from the steering wheel when rotating the steering wheel, the steered road wheels are about to return to a neutral position (straight travel direction) under a self-aligning torque. If, on this occasion, the above steering assist force in the rotating direction has been generated, the steered road wheels may be inhibited from returning to the neutral position.

Under these circumstances, a proposal has been made for an invention in which the steering assist force in the rotating direction is restricted depending on the steering state of the steering wheel (see Patent Document 1). Patent Document 1 describes that a steering assist command value is determined based on a steering torque and a vehicle speed, the electric motor is controlled according to this value and, at this time, the steering assist command value is restricted (the steering assist force in the rotating direction is restricted) in accordance with the steering state. Concretely, the patent document describes that in a region where the steering torque is great, the steering assist command value is not restricted based on the judgment that the steering wheel is being operated (rotated), whereas in a region where the steering torque is small, the steering assist command value is restricted based on the judgment that the steering wheel is in a return state where the hands have been released from the steering wheel.

By so restricting the steering assist command value, as appropriate, the steered road wheels become easily returnable to the neutral position in a steering wheel return state where the hands have been released from the steering wheel.
[Patent Document 1] JP-A-2009-196573

With the invention according to Patent Document 1, however, even in a steering wheel return state (a state where the hands have been released from the steering wheel), the steering assist force in the rotating direction continues to occur. Even in the invention described in Patent Document 1, therefore, there is a possibility that the return of the steered road wheels to the neutral position will be delayed.

The present invention has been accomplished in the light of the above circumstances. It is an object of the present invention to provide an electric power steering apparatus which can return the steering wheel and the steered road wheels to the neutral position at an earlier time if the driver releases his or her hands from the steering wheel when rotating the steering wheel.

One aspect of the present invention, which solves the above-mentioned problems, is an electric power steering apparatus comprising: an electric actuator for generating a steering assist force for a steering mechanism of a vehicle; and a control device that controls the steering assist force generated by the electric actuator in accordance with a steering operation of a steering wheel by a driver, wherein the control device comprises a rotating assist force computing unit that computes an assist force in a rotating direction of the steering wheel in accordance with a steering state of the steering wheel, a returning assist force computing unit that computes a returning assist force, which is the steering assist force in a direction opposite to the rotating direction, in accordance with the steering state of the steering wheel, and a summing unit that adds up the computed assist force in the rotating direction and the computed returning assist force.

MODE FOR CARRYING OUT THE INVENTION

Embodiments of the present invention will be described in detail by reference to the accompanying drawings.

Embodiment 1

Figure 1:
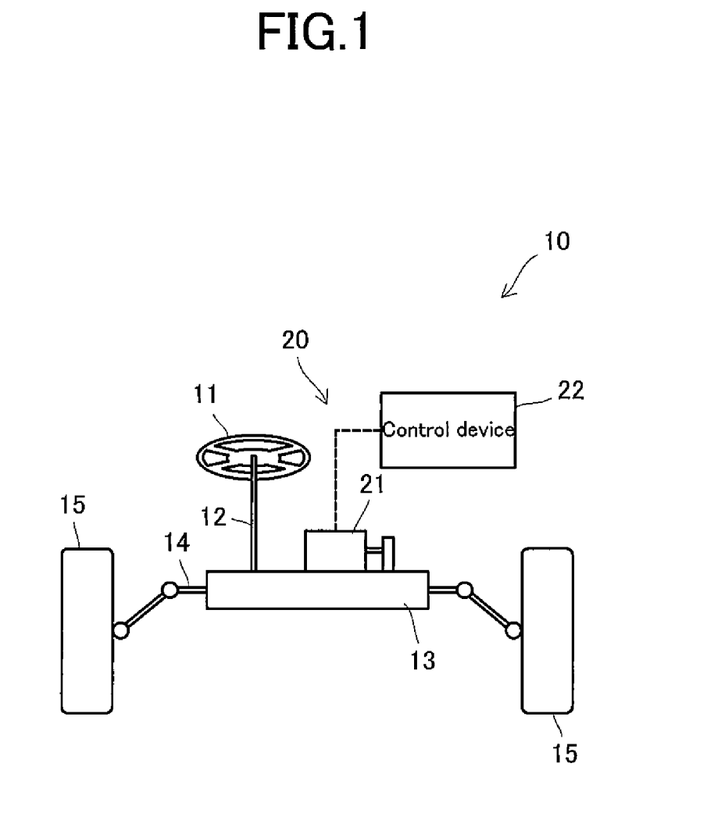
FIG. 1 is a view showing the schematic configuration of an electric power steering apparatus according to Embodiment 1 of the present invention.

As shown in FIG. 1, a vehicle 10 is equipped with a steering wheel 11, and the steering wheel 11 is coupled to front wheels 15, which are steered road wheels of the vehicle 10, via a steering shaft 12, a steering mechanism 13, and tie rods 14. When the steering wheel 11 is steered by a driver, a steering torque (steering force) is transmitted to the steering mechanism 13 via the steering shaft 12. By the transmission of the steering torque of the steering wheel 11 to the steering mechanism 13, the front wheels 15 are steered via the tie rods 14.

The vehicle 10 includes an electric power steering apparatus 20 which generates a steering assist force conformed to the steering state of the steering wheel 11 and inputs it to the steering mechanism 13, thereby assisting in the steering of the steering wheel 11 by the driver.

Figure 2:
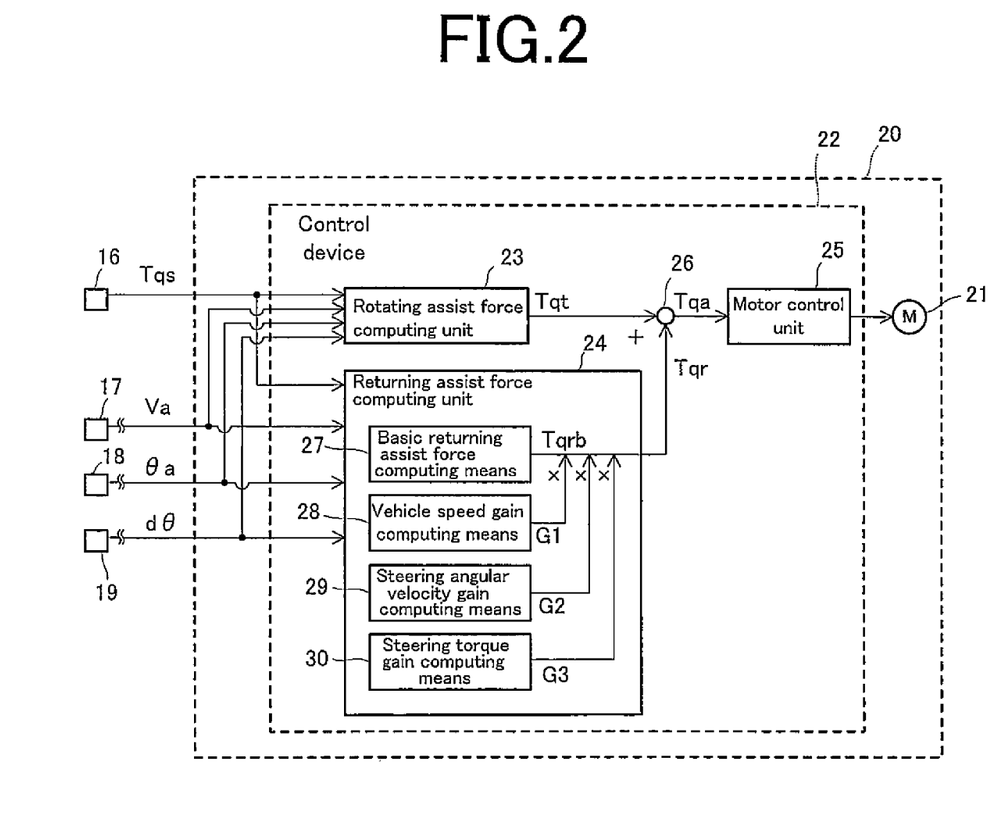
FIG. 2 is a block diagram showing the schematic configuration of the electric power steering apparatus according to Embodiment 1 of the present invention.

The electric power steering apparatus 20, as shown in FIGS. 1 and 2, includes a motor 21 which is an electric actuator for generating the steering assist force to be inputted to the steering mechanism 13; and a control device (a control means) 22 for controlling the magnitude of the steering assist force to be generated by the motor 21 in response to the rotating operation of the steering wheel 11 by the driver.

The vehicle 10 has a steering torque sensor 16, a vehicle speed sensor 17, a steering angle sensor 18, and a steering angular velocity sensor 19, as shown in FIG. 2. The steering torque sensor 16 detects a steering torque $T_{qs}$ which is inputted by the driver to the steering wheel 11 to act on the steering shaft 12. The vehicle speed sensor 17 detects the speed of the vehicle 10 (vehicle speed, $V_a$). The steering angle sensor 18 detects the steering angle $\theta_a$ of the steering wheel 11 operated by the driver. The steering angular velocity sensor 19 detects the steering angular velocity $d\theta$ of the steering wheel 11 operated by the driver. The steering angular velocity $d\theta$ may be calculated by differentiating the steering angle $\theta_a$ detected by the steering angle sensor 18 with respect to time.

Based on these pieces of detected information from the steering torque sensor 16, vehicle speed sensor 17, steering angle sensor 18, and steering angular velocity sensor 19 provided in the vehicle 10, the control device 22 assesses, as appropriate, the steering state of the steering wheel 11 and, based on the results of the assessment, controls the magnitude of a steering assist force $T_{qa}$ to be inputted to the steering mechanism 13. In the present embodiment, the control device 22 acquires the pieces of information (vehicle speed $V_a$, steering angle $\theta_a$ and steering angular velocity $d\theta$) from the vehicle speed sensor 17, steering angle sensor 18, and steering angular velocity sensor 19 of the vehicle 10 by CAN (Controller Area Network) communications.

When the steering wheel 11 is rotationally operated by the driver, for example, the control device 22 allows the motor 21 to generate the steering assist force $T_{qa}$ in the rotating direction (plus direction) of the steering wheel 11, as will be described in detail later. In a state where the driver releases his or her hands from the steering wheel 11 (steering wheel return state) when rotating the steering wheel 11, the control device 22 allows the motor 21 to generate the steering assist force $T_{qa}$ in a direction opposite to the rotating direction (i.e., minus direction) of the steering wheel 11. Consequently, when the driver releases his or her hands from the steering wheel 11 during rotation of the steering wheel 11, the front wheels 15 as the steered road wheels can be returned to the neutral position at an earlier time. Moreover, a sense of reaction and an uncomfortable feeling while operating the steering wheel 11 can be reduced.

The control device 22 according to the present embodiment has a rotating assist force computing unit 23, a returning assist force computing unit 24, a motor control unit 25, and a summing unit 26 for adding up the computed assist forces. The rotating assist force computing unit 23, the returning assist force computing unit 24, and the summing unit 26 compute the magnitude of the steering assist force $T_{qa}$ to be inputted to the steering mechanism 13, in accordance with the steering state of the steering wheel 11. The magnitude of the steering assist force $T_{qa}$ is proportional to the magnitude of the current supplied to the motor 21. In the present embodiment, the rotating assist force computing unit 23 determines the steering state of the steering wheel 11, based on the detected information from the steering torque sensor 16, the vehicle speed sensor 17, etc. and, in accordance with the results of the determination, computes the magnitude of the steering assist force in the rotating direction (rotating assist force $T_{qt}$).

Concretely, the rotating assist force computing unit 23 finds a basic rotating assist force $T_{qtb}$ by computation in accordance with the steering torque $T_{qs}$ detected by the steering torque sensor 16, and corrects the basic rotating assist force $T_{qtb}$ based on the vehicle speed $V_a$, etc. acquired by the CAN communications to determine the magnitude of the rotating assist force $T_{qt}$. In this manner, the rotating assist force $T_{qt}$ is obtained by correcting the basic rotating assist force $T_{qt}$ b, so that convergence compensation, inertia compensation, etc. of the rotating assist force $T_{qt}$, for example, are made. Since these compensation control technologies are well-known ones, explanations for them are omitted herein. Of course, the method of determining the rotating assist force $T_{qt}$ is not particularly limited.

The rotating assist force $T_{qt}$ computed by the rotating assist force computing unit 23 is greater as the steering torque $T_{qs}$ of the steering wheel 11 is increased, for example, if the driver is rotating the steering wheel 11 from the neutral position (straight travel direction) to the left. If the driver releases his or her hands from the steering wheel 11 (steering wheel return state) when rotating the steering wheel 11 leftward from the neutral position, for example, the steering torque $T_{qs}$ of the steering wheel 11 becomes substantially zero. Thus, the rotating assist force $T_{qt}$ computed by the rotating assist force computing unit 23 decreases and converges to zero.

The returning assist force computing unit 24, for example, assesses the steering state of the steering wheel 11 based on the steering angle $\theta_a$ acquired by the CAN communications and, if it judges that the steering wheel 11 is in the process of steering, computes the steering assist force in the direction opposite to the direction of the rotating assist force $T_{qt}$ of the steering wheel 11 (i.e., returning assist force $T_{qr}$). The term "in the process of steering" is meant to include not only a state in which the driver is performing a rotating operation or an inverse-rotating operation on the steering wheel 11, but also a state in which the driver rotates the steering wheel 11 and releases his or her hands from the steering wheel 11 (steering wheel return state), and further a state in which the driver holds the steering wheel 11 in a rotated state (steering wheel holding state).

The rotating assist force $T_{qt}$ found by the rotating assist force computing unit 23, and the returning assist force $T_{qr}$ found by the returning assist force computing unit 24 are added together by the summing unit 26, whereby the steering assist force $T_{qa}$ is found. The resulting steering assist force $T_{qa}$ is sent to the motor control unit 25.

The motor control unit 25 controls the amount of current to be supplied to the motor 21. That is, the motor control unit 25 controls the amount of current for supply to the motor 21 so that the steering assist force $T_{qa}$ found is generated.

With the electric power steering apparatus 20 according to the present invention, as described above, the rotating assist force $T_{qt}$ in the rotating direction (plus direction) of the steering wheel 11 and the returning assist force $T_{qr}$ in the direction (minus direction) opposite to the rotating direction of the steering wheel 11 are inputted, as the steering assist force $T_{qa}$, to the steering mechanism 13.

Thus, not only during the rotating operation of the steering wheel 11, but also during the release of the hands from the steering wheel 11 (steering wheel return state), the operation of the steering wheel 11 (steering of the front wheels 15 as the steered road wheels) is appropriately assisted. That is, when the hands are released from the steering wheel 11, the front wheels 15 as the steered road wheels (steering wheel 11) can be returned to the neutral position at an earlier time.

While the steering wheel 11 is being rotationally operated, for example, the rotating assist force $T_{qt}$ computed by the rotating assist force computing unit 23 is greater than the returning assist force $T_{qr}$ computed by the returning assist force computing unit 24. Thus, the steering assist force $T_{qa}$ in the rotating direction (plus direction) of the steering wheel 11 is inputted to the steering mechanism 13. As a result, the driver can perform the rotating operation of the steering wheel 11 with a relatively weak force.

In case the driver releases his or her hands from the steering wheel 11 (steering wheel return state) when the steering wheel 11 is rotated, the steering torque $T_{qs}$ becomes substantially zero. Thus, the rotating assist force $T_{qt}$ determined by the rotating assist force computing unit 23 decreases greatly. Accordingly, the steering assist force $T_{qa}$ in the rotating direction weakens. In addition, based on the returning assist force $T_{qr}$ added from the beginning of the rotating operation, the front wheels 15 as the steered road wheels and the steering wheel 11 become easily returnable to the neutral position.

Furthermore, the rotating assist force $T_{qt}$ further decreases with decrease in the steering angle $\theta_a$ of the steering wheel 11, and becomes lower than the returning assist force $T_{qr}$. As a result, the steering assist force $T_{qa}$ in the opposite direction (minus direction) to the rotating direction is inputted to the steering mechanism 13.

Here, as in the conventional practice, it is possible to assess the steering state of the steering wheel and, if the steering wheel return state is determined, restrict the rotating assist force, thereby assisting in the operation of the steering wheel (steering of the steered road wheels). Simply restricting the rotating assist force, however, is not enough to exert an assist force in the steering wheel return state. Also, the assessment of the steering state of the steering wheel is difficult and, when the steering wheel is operated based on the results of the assessment, an uncomfortable feeling is apt to occur.

According to the present invention, on the other hand, in the steering wheel return state as described above, the steering assist force $T_{qa}$ in the rotating direction weakens, and the steering assist force $T_{qa}$ in the opposite direction (minus direction) to the rotating direction is inputted to the steering mechanism 13. Thus, it becomes further easier for the front wheels 15, as the steered road wheels, and the steering wheel 11 to return to the neutral position. In the present invention, moreover, the returning assist force $T_{qr}$ is inputted to the steering mechanism 13 not only in the steering wheel return state, but also during the rotating operation of the steering wheel 11. Hence, the occurrence of an uncomfortable feeling in operating the steering wheel 11 can be reduced.

By the way, the returning assist force computing unit 24 according to the present embodiment finds the basic returning assist force $T_{qrb}$ by computation, and corrects the basic returning assist force $T_{qrb}$, as appropriate, to find the returning assist force $T_{qr}$. By this procedure, the returning assist force $T_{qr}$ conformed to the steering state of the steering wheel 11 can be computed more appropriately.

Concretely, the returning assist force computing unit 24 has a basic returning assist force computing means 27, a vehicle speed gain computing means 28, a steering angular velocity gain computing means 29, and a steering torque gain computing means 30, as shown in FIG. 2.

Figure 3:
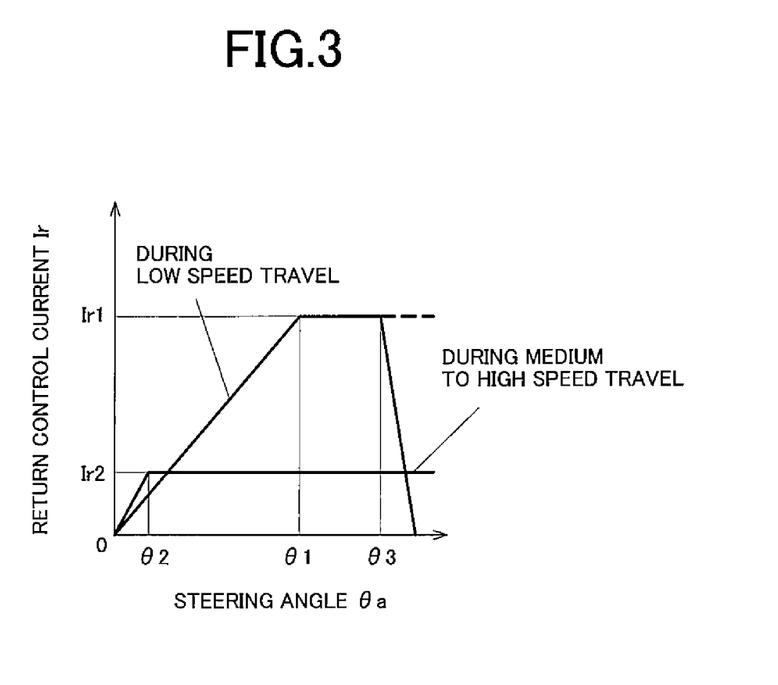
FIG. 3 is a view showing an example of a map defining the relation between the steering angle of a steering wheel and a return control current (basic returning assist force).

The basic returning assist force computing means 27 computes the basic returning assist force $T_{qrb}$ based on the detection results of the steering angle sensor 18. Concretely, the basic returning assist force computing means 27 finds the basic returning assist force $T_{qrb}$ by referring to a map defining a relation as shown in FIG. 3. As stated earlier, the magnitude of the steering assist force $T_{qa}$ is proportional to the magnitude of the current supplied to the motor 21, and the magnitude of the basic returning assist force (steering assist force) $T_{qrb}$ is proportional to the magnitude of a return control current $I_r$ to be supplied to the motor 21. In FIG. 3, therefore, the relation between the steering angle $\theta_a$ of the steering wheel 11 and the basic returning assist force $T_{qrb}$ is defined as the relation between the steering angle $\theta_a$ of the steering wheel 11 and the return control current $I_r$. The return control current $I_r$ is the amount of current necessary for the motor 21 to generate a predetermined returning assist force $T_{qr}$.

The basic returning assist force computing means 27 also sets by computation the basic returning assist force $T_{qrb}$ in response to the speed of the vehicle 10 (vehicle speed). In detail, in a low speed travel in which the speed of the vehicle 10 is equal to or lower than a preset first speed (e.g., of the order of 60 km/h), the basic returning assist force computing means 27 increases the basic returning assist force $T_{qrb}$ to a first torque (first current value $I_r1$) in accordance with an increase in the steering angle $\theta_a$ of the steering wheel 11, as shown in FIG. 3. In this example, the steering angle $\theta_a$ of the steering wheel 11 is a first steering angle $\theta1$ (e.g., an angle of the order of 70° from the neutral position), and the basic returning assist force $T_{qrb}$ comes to the first torque (first current value $I_r1$).

In a medium to high speed travel in which the speed of the vehicle 10 is higher than the preset first speed, the basic returning assist force computing means 27 increases the basic returning assist force $T_{qrb}$ to a second torque (second current value $I_r2$), which is lower than the first torque (first current value $I_r1$), in accordance with an increase in the steering angle $\theta_a$ of the steering wheel 11, as shown in FIG. 3. In this example, the steering angle $\theta_a$ of the steering wheel 11 is a second steering angle $\theta2$ (e.g., an angle of the order of 10° from the neutral position), and the basic returning assist force $T_{qrb}$ comes to the second torque (second current value $I_r2$). That is, during the medium to high speed travel, the maximum value of the basic returning assist force $T_{qrb}$ is lower than that during the low speed travel.

In the present embodiment, moreover, when the vehicle 10 is traveling at a low speed, the basic returning assist force $T_{qrb}$ is increased to the first torque (first current value $I_r1$) at a first inclination, whereas when the vehicle 10 is traveling at a medium to high speed, the basic returning assist force $T_{qrb}$ is increased to the second torque (second current value $I_r2$) at a second inclination which is greater than the first inclination.

During the low speed travel of the vehicle 10, moreover, when the steering angle $\theta_a$ of the steering wheel 11 exceeds the first steering angle $\theta1$ and reaches a third steering angle $\theta3$ (e.g., an angle of the order of 90° from the neutral position), for example, the basic returning assist force computing means 27 decreases the basic returning assist force $T_{qrb}$ from the first torque (first current value $I_r1$) in accordance with an increase in the steering angle $\theta_a$ of the steering wheel 11. As indicated by a dashed line in FIG. 3, the basic returning assist force $T_{qrb}$ may be maintained at the first torque (first current value $I_r1$) even when the steering angle $\theta_a$ exceeds the first steering angle $\theta1$.

As noted above, the basic returning assist force $T_{qrb}$ corresponding to the steering angle $\theta_a$ of the steering wheel 11 is set by computation, as appropriate, in accordance with the vehicle speed, whereby the steering assist force $T_{qa}$ can be controlled more appropriately. For example, when the vehicle 10 is traveling at a low speed, the maximum value of the basic returning assist force $T_{qrb}$ conformed to the steering angle $\theta_a$ of the steering wheel 11 is set to be a relatively high value (first torque). By so doing, even if the hands are released from the steering wheel 11 when the steering angle $\theta_a$ of the steering wheel 11 is relatively large, the steering wheel 11 can be returned to the neutral position appropriately.

For example, when the vehicle 10 is traveling at a medium to high speed, on the other hand, the maximum value of the basic returning assist force $T_{qrb}$ conformed to the steering angle $\theta_a$ of the steering wheel 11 is set to be a relatively low value (second torque), and the inclination of the basic returning assist force $T_{qrb}$ when increasing is set to be greater than during the low speed travel. By so doing, the straight traveling stability of the vehicle 10 during the medium to high speed travel can be enhanced. When the vehicle 10 is traveling at the medium to high speed, the steering angle $\theta_a$ of the steering wheel 11 does not become very large. Thus, the operation of the steering wheel 11 can be assisted appropriately, with the maximum value of the basic returning assist force $T_{qrb}$ being set to be a relatively low value (second torque).

The vehicle speed gain computing means 28 performs computation based on the vehicle speed $V_a$ acquired by the CAN communications, and sets a vehicle speed gain G1 (0≤G1≤1). This vehicle speed gain G1 is a gain in the returning assist force $T_{qr}$ set based on the vehicle speed $V_a$ and, for example, is set at a higher value as the speed of the vehicle 10 becomes lower. The steering angular velocity gain computing means 29 sets a steering angular velocity gain G2 (0≤G2≤1) based on the steering angle $\theta_a$ acquired by the CAN communications. This steering angular velocity gain G2 is a gain in the returning assist force $T_{qr}$ set based on the steering angle $\theta_a$ and, for example, is set at a lower value as the steering angular velocity of the steering wheel 11 slows.

Figure 4:
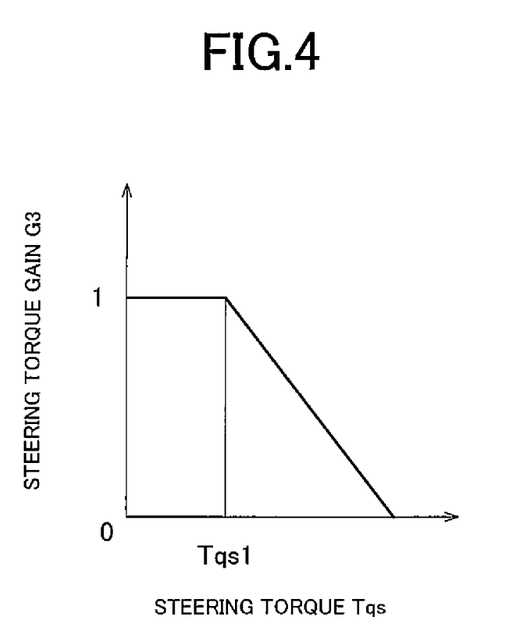
FIG. 4 is a view showing an example of a map defining the relation between the steering torque of the steering wheel and a steering torque gain.

The steering torque gain computing means 30 performs computation, and sets a steering torque gain G3, based on the detection results of the steering torque sensor 16. The steering torque gain G3 is a gain in the returning assist force $T_{qr}$ set based on the steering torque $T_{qs}$ detected by the steering torque sensor 16. If the steering torque $T_{qs}$ of the steering wheel 11 reaches a predetermined value or higher, for example, the steering torque gain computing means 30 sets the steering torque gain G3 to become gradually smaller (0≤G3≤1). In the present embodiment, the steering torque gain computing means 30, for example, refers to a map defining a relation as shown in FIG. 4 and, if the steering torque $T_{qs}$ exceeds a first steering torque $T_{qs}1$, decreases the steering torque gain G3 gradually. In FIG. 4, the steering torque gain G3 is decreased from 1, but may be decreased from a value less than 1.

The returning assist force computing unit 24 multiplies the basic returning assist force $T_{qrb}$ by the so computed vehicle speed gain G1, steering angular velocity gain G2, and steering torque gain G3 to determine the returning assist force $T_{qr}$.

According to the above procedures, the vehicle speed gain G1 and the steering angular velocity gain G2 are set as appropriate, the steering torque gain G3 is further set as appropriate, and the returning assist force $T_{qr}$ is controlled based on the vehicle speed gain G1, the steering angular velocity gain G2, and the steering torque gain G3, whereby the returning assist force $T_{qr}$ can be controlled more appropriately. Accordingly, a sense of reaction and an uncomfortable feeling when steering the steering wheel 11 can be reduced.

According to the electric power steering apparatus 20, as described above, even if the driver releases his or her hands from the steering wheel 11 during rotation of the steering wheel 11, the steered road wheels 15 can be returned to the neutral position at an earlier time. Moreover, a sense of reaction and an uncomfortable feeling while operating the steering wheel 11 can be reduced. According to the electric power steering apparatus 20, moreover, the return of the steered road wheels 15 to the neutral position during a low speed travel can be quickened, while the straight traveling stability of the vehicle 10 during a high speed travel can be enhanced. Furthermore, the electric power steering apparatus 20 makes the rotating operation of the steering wheel 11 easier when the steering wheel 11 has been rotated through a great angle. Besides, the electric power steering apparatus 20 makes it possible to suppress the inhibition of the rotating operation of the steering wheel 11 by the returning assist force.

Embodiment 2

Figure 5:
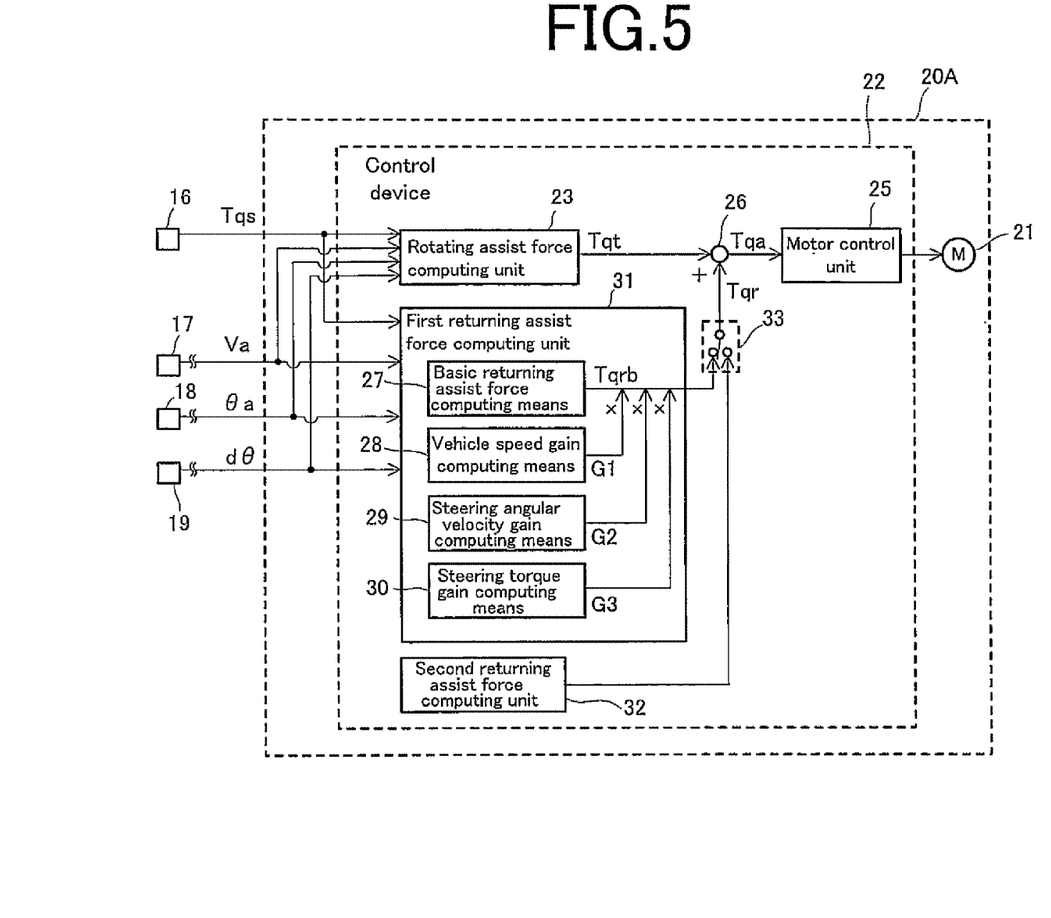
FIG. 5 is a block diagram showing the schematic configuration of an electric power steering apparatus according to Embodiment 2 of the present invention.

FIG. 5 is a block diagram showing the schematic configuration of an electric power steering apparatus 20A according to Embodiment 2.

As shown in FIG. 5, the electric power steering apparatus 20A according to the present embodiment is equipped with a first returning assist force computing unit 31 corresponding to the returning assist force computing unit 24 in Embodiment 1, and is also equipped with a second returning assist force computing unit 32. The first returning assist force computing unit 31 and the second returning assist force computing unit 32 are connected to a summing unit 26 via a switch unit 33.

The first returning assist force computing unit 31 corresponding to the returning assist force computing unit 24 in Embodiment 1 computes a returning assist force $T_{qr}$ based on the pieces of information, i.e., vehicle speed, steering angle, and steering angular velocity, acquired by the CAN communications, as mentioned earlier.

The second returning assist force computing unit 32, on the other hand, does not use the CAN communications, but corrects a basic returning assist force $T_{qrb}$ based on the pieces of information obtainable from the steering wheel 11, for example, steering angle and steering torque, to compute the returning assist force $T_{qr}$. Even the control over the returning assist force $T_{qr}$ by the second returning assist force computing unit 32 can assist, to some extent, the operation of the steering wheel 11 (steering of the front wheels 15 as the steered road wheels).

The switch unit 33 may be one which can switch between the connection of the first returning assist force computing unit 31 to the summing unit 26 and the connection of the second returning assist force computing unit 32 to the summing unit 26, and the configuration of the switch unit 33 is not particularly limited. The switch unit 33 is configured to connect the first returning assist force computing unit 31 to the summing unit 26 while the CAN communications are functioning normally; and to switch the connection to the connection of the second returning assist force computing unit 32 to the summing unit 26 if an abnormality in the CAN communications is detected.

According to the above-mentioned features of the present embodiment, if the CAN communications are in a normal state, the operation of the steering wheel 11 (steering of the front wheels 15 as the steered road wheels) can be assisted appropriately. Even if an abnormality occurs in the CAN communications, the operation of the steering wheel 11 (steering of the front wheels 15 as the steered road wheels) can be assisted. That is, even in the event of an abnormality in the CAN communications, the poor return of the steering wheel 11 to the neutral position in the steering wheel return state can be suppressed.

The embodiments of the present invention have been described above, but the invention is in no way limited to these embodiments. The invention can be changed or modified, as appropriate, without departing from the scope and spirit of the invention.

EXPLANATIONS OF LETTERS OR NUMERALS

10 Vehicle
11 Steering wheel
12 Steering shaft
13 Steering mechanism
14 Tie rod
15 Front wheel (steered road wheel)
16 Steering torque sensor
17 Vehicle speed sensor
18 Steering angle sensor
19 Steering angular velocity sensor
20 Electric power steering apparatus
21 Motor
22 Control device
23 Rotating assist force computing unit
24 Returning assist force computing unit
25 Motor control unit
26 Summing unit
27 Basic returning assist force computing means
28 Vehicle speed gain computing means
29 Steering angular velocity gain computing means
30 Steering torque gain computing means
31 First returning assist force computing unit
32 Second returning assist force computing unit
33 Switch unit

The invention claimed is:

1. An electric power steering apparatus comprising:
an electric actuator for generating a steering assist force for a steering mechanism of a vehicle; and
a control device that controls the steering assist force generated by the electric actuator in accordance with a steering operation of a steering wheel by a driver,
wherein the control device comprises
a rotating assist force computing unit that computes an assist force in a rotating direction of the steering wheel in accordance with a steering state of the steering wheel,
a returning assist force computing unit that computes a returning assist force, which is the steering assist force in a direction opposite to the rotating direction, in accordance with the steering state of the steering wheel, and
a summing unit that adds up the computed assist force in the rotating direction and the computed returning assist force,
wherein
if a vehicle speed is equal to or lower than a first speed, the returning assist force computing unit increases the returning assist force to a first torque in accordance with an increase in a steering angle of the steering wheel, and
if the vehicle speed is higher than the first speed, the returning assist force computing unit increases the returning assist force to a second torque, which is lower than the first torque, in accordance with an increase in the steering angle of the steering wheel, and
wherein
if the vehicle speed is equal to or lower than the first speed, the returning assist force computing unit increases the returning assist force at a first inclination, and
if the vehicle speed is higher than the first speed, the returning assist force computing unit increases the returning assist force at a second inclination which is greater than the first inclination.

2. The electric power steering apparatus according to claim 1, wherein
if the steering angle of the steering wheel exceeds a first steering angle when the vehicle speed is equal to or lower than the first speed, the returning assist force computing unit decreases the returning assist force from the first torque in accordance with an increase in the steering angle of the steering wheel.

3. The electric power steering apparatus according to claim 2, wherein
if a steering torque of the steering wheel reaches a predetermined value or higher, the returning assist force computing unit gradually decreases a gain in the returning assist force.

4. The electric power steering apparatus according to claim 1, wherein
if a steering torque of the steering wheel reaches a predetermined value or higher, the returning assist force computing unit gradually decreases a gain in the returning assist force.

* * * * *